United States Patent [19]

Mendenhall

[11] Patent Number: 5,366,746
[45] Date of Patent: Nov. 22, 1994

[54] ULTRA-HIGH TEMPERATURE PASTEURIZATION AND ELECTRON BEAM TECHNOLOGY FOR STERILIZATION OF MEAT AND MEAT PRODUCTS

[75] Inventor: Von T. Mendenhall, Hyde Park, Utah

[73] Assignee: Utah State University Foundation, Logan, Utah

[21] Appl. No.: 131,321

[22] Filed: Oct. 4, 1993

Related U.S. Application Data

[63] Continuation-in-part of Ser. No. 944,792, Sep. 14, 1992, abandoned, which is a continuation of Ser. No. 573,358, Aug. 27, 1990, abandoned.

[51] Int. Cl.$^5$ ............................................. A23L 3/00
[52] U.S. Cl. ................................... 426/521; 426/234
[58] Field of Search .................... 426/234, 520, 521

[56] References Cited

U.S. PATENT DOCUMENTS

| | | | |
|---|---|---|---|
| 273,094 | 2/1883 | Jennings | 426/521 |
| 2,456,909 | 12/1948 | Brasch | 426/240 |
| 3,567,462 | 3/1971 | Silverman et al. | 426/240 |
| 3,685,308 | 8/1972 | Lundquist | 62/60 |
| 3,876,373 | 4/1975 | Glyptis | 426/238 |
| 3,912,823 | 10/1975 | Kane | 426/129 |
| 4,045,579 | 8/1977 | Rogers | 426/521 |
| 4,201,796 | 5/1980 | Harkins | 426/238 |
| 4,384,006 | 5/1983 | Wallick | 426/383 |
| 4,539,212 | 9/1985 | Hunter | 426/521 |
| 4,572,839 | 2/1986 | Guitteny et al. | 426/521 |
| 4,675,202 | 6/1987 | Wenger et al. | 426/521 |
| 4,812,320 | 3/1989 | Ruzek | 426/129 |

OTHER PUBLICATIONS

Hood et al, 8 J. Food Technol. 333 (1973).
Miller et al, 50 J. Food Sci. 1544 (1985).
Seideman et al, 39 J. Milk Food Technol. 745 (1976).
Seideman et al, 41 J. Food Sci. 738 (1976).
Joy of Cooking published by the Bobbs-Merrill Co., 1975 (pp. 146 and 447–448).

*Primary Examiner*—George Yeung
*Attorney, Agent, or Firm*—Thorpe, North & Western

[57] ABSTRACT

A method is disclosed for accelerating the ageing process and sterilizing raw meat for extended storage at refrigerated temperatures by treating the meat at ultra-high temperature (UHT), e.g. 900° to 1200° C., for a time sufficient to denature proteins, without burning, to a depth of up to about 2 mm. After UHT treatment the meat is cooled to a refrigerated temperature and packaged in a hermetically sealed container. The meat can be rendered storage stable at ambient temperatures by subjecting the hermetically sealed meat to electron beam radiation (EBR) at an irradiating dosage sufficient to destroy all mesophilic vegetative pathogens, spores of pathogens, toxins, and spoilage microorganisms which grow at ambient temperatures.

22 Claims, No Drawings

ULTRA-HIGH TEMPERATURE PASTEURIZATION AND ELECTRON BEAM TECHNOLOGY FOR STERILIZATION OF MEAT AND MEAT PRODUCTS

This is a continuation-in-part of application Ser. No. 07/944,792, filed Sep. 14, 1992, now abandoned, which is a continuation of application Ser. No. 07/573,358, filed Aug. 27, 1990, and now abandoned.

BACKGROUND OF THE INVENTION

This invention relates to commercial sterilization of meat and meat products by altering the character of the meat surface. More particularly, this invention relates to a method of combining ultra-high temperature pasteurization and electron beam radiation to produce commercially sterile raw meat and meat products that may be stored without refrigeration. Only the surface or visible portion is altered with the remainder of the deep muscle tissue below about 2 mm remaining in its raw or unaltered state except for the destruction of microorganisms.

Extending the storage life of meat and meat products has been a subject of mankind's ingenuity since before recorded history. Many procedures have been developed, but they are all subject to certain limitations. Cooking, smoking, and curing all render meat less susceptible to spoilage, but the flavor of the meat is altered, sometimes drastically, and the meat is still subject to eventual spoilage. Chemical additives may be effective preservatives, but commercial acceptance and regulatory approval have been limiting factors. Meat can be frozen and stored for extended periods of time without seriously affecting flavor or palatability, but maintaining the meat in a frozen state is expensive.

Consumers discriminate against fresh beef steaks that contain more than about 25% surface discoloration. D. Hood & E. Riordan, 8 J. Food Technol. 333 (1973). Surface discoloration of 50–75% is evident in fresh beef steaks after 4 days of retail display using primal cut packaging/precutting treatments. M. Miller et al., 50 J. Food Sci. 1544 (1985). Cutting subprimals into steaks, followed by vacuum packaging tends to decrease retail case life, juiciness, and tenderness. Retail fresh meat establishments have very few alternatives when disposing of discolored higher priced cuts except reducing price, retrimming, and grinding, all of which involve loss of value. Similarly, vacuum-packaged primal beef cuts lose quality after 45–60 days of storage depending on the storage temperature, degree of evacuation, permeability of the packaging material, initial load, and composition of the primal. S. Seideman et al., 39 J. Milk Food Technol. 745 (1976); S. Seideman et al., 41 J. Food Sci. 738 (1976). Since the loss of bloom and the growth of microorganisms (assuming internal muscle sterility) are both primarily surface phenomena, the application of technology to improve the appearance of the surface and control microbial growth would be beneficial to extending shelf life.

Methods of sterilizing meat and other animal tissues with high temperature treatment have been described previously. U.S. Pat. No. 4,539,212 to Hunter teaches a process for sterilizing low-acid food containing meat or textured vegetable protein by acidifying the food, heating at high temperature (104°–137° C.) for a short time (5–60 seconds), and packing with a hot-fill-and-hold procedure. U.S. Pat. No. 4,572,839 to Guitteny et al. teaches a method of high temperature sterilization of animal protein by grinding the raw material to make a slurry, partially hydrolyzing it, and heating a thin layer of the slurry to about 120°–150° C. for about 3 seconds to 15 minutes. U.S. Pat. No. 4,675,202 to Wenger et al. discloses a method of sterilizing a slurry containing egg yolks by acidifying and then heating at temperatures between 128°–155° C. for a period of 1–50 seconds. U.S. Pat. No. 4,201,796 to Harkins discloses a method of cooking meat by searing the surface of a cut or patty of meat by brief exposure to a blow torch pencil burner while leaving the inside of the meat relatively raw, refrigerating or freezing the meat, and cooking thoroughly in a microwave oven.

Methods for sterilizing and preserving food products with electron beam technology have also been described. U.S. Pat. No. 2,456,909 to Brasch discloses a method of sterilizing various types of meat including beef, pork, chicken, calf liver, and oysters with electron beam radiation. The method involves placing the food to be sterilized in a container and removing air by introducing an inert gas or evacuating the container, sealing the container air tight, freezing the food at −20° C. to −100° C., and irradiating the food with 3 to 6 MeV of high speed electrons during a series of consecutive very short time periods, each lasting less $10^{-4}$ of a second. Brasch found it necessary to freeze the food to avoid changes in taste, odor, appearance, and structure due to unwanted side reactions such as formation of hydrogen peroxide, ozone, nitrous oxides, mercaptans, and sulfides; denaturation of proteins; decarboxylation; and hydrolysis. U.S. Pat. No. 3,876,373 to Glyptis discloses electron beam sterilization as a prior art sterilization method, but rejected it for reasons of safety, expense, and alteration of the taste and color of the food.

Preservation of food by exposure to ionizing radiation has also been described, such as in U.S. Pat. No. 3,567,462 to Silverman et al., which shows a method for extending the storage life of fresh animal tissue by pasteurizing the tissue by exposure to radiation and storing at refrigerated temperatures (0°–7.2° C.) in an atmosphere of 30–100% $CO_2$.

In view of the foregoing, it will be appreciated that providing a method for sterilizing meat and meat products on a commercial scale that eliminates the need to refrigerate meat would be a significant advancement in the art.

Another significant advancement in the art would be to provide a method of reducing the cost of aging meat.

A further advancement in the art would be providing meat that is pathogen free, attractive in appearance, and ready for cooking in a microwave oven. Related to this would be providing a method for increasing the value of discolored retail cuts of meat. Still another advancement in the art would be to seal the surface of a cut of meat to inhibit dehydration and to enhance even heat distribution upon cooking in a microwave oven, and to improve the flavor of meat cooked in a microwave oven.

OBJECTS AND SUMMARY OF THE INVENTION

An object of the present invention is to provide a method of commercially sterilizing raw meat and meat products.

Another object of the invention is to provide a commercial sterilization method that eliminates the need to refrigerate meat for storage and marketing.

A further object of the invention is to reduce the time and cost associated with aging meat.

Still another object of the invention is to provide a cut of meat that is pathogen free, attractive in appearance, and ready for cooking in a microwave oven.

Yet another object of the invention is to increase the value of discolored retail cuts of meat.

A still further object of the invention is to seal the surface of a cut of meat to inhibit dehydration and to enhance even heat distribution upon cooking in a microwave oven.

Another object of the invention is to improve the tenderness and flavor of meat cooked in a microwave oven.

Still another object of the invention is to sterilize cuts of meat on a commercial scale at a minimum cost.

These and other objects may be accomplished by sterilizing meat through a method comprising the steps of (a) treating the meat at ultra-high temperature for a time sufficient to denature surface proteins, without burning, to a depth of up to about 1 mm and not more than about 2 mm; (b) cooling the meat to a refrigerated temperature; (c) hermetically sealing the meat in an inert atmosphere, and (d) irradiating the hermetically sealed meat with an electron beam dosage sufficient to destroy all mesophilic vegetative pathogens, spores of pathogens, toxins, and spoilage microorganisms.

DETAILED DESCRIPTION OF THE INVENTION

Although the present invention, as described herein, presents the best embodiment presently known for using ultra-high temperature pasteurization and electron beam radiation to commercially sterilize meat and meat products, it is to be understood that this invention is not limited to the particular process steps and materials disclosed herein as such process steps and materials may, of course, vary. It is also to be understood that the terminology used herein is used for the purpose of describing particular embodiments only and is not intended to be limiting since the scope of the present invention will be limited only by the appended claims.

As used herein, "meat" means those animal tissues that are suitable for use as food including, but not limited to beef, pork, lamb, poultry, and fish. Meat includes the carcass, primal, and retail cuts of muscle tissue as well as ground and processed forms, or what may be commonly called meat products.

As used herein, "ultra-high temperature" or "UHT" means temperatures in the range of about 900°–1300° C.

Also, as used herein the term "electron beam radiation" or "EBR" means high speed electrons generated from properly shielded machine sources at energies up to about 10 million electron volts (10 MeV).

Ultra-High Temperature Treatment

The specific method used for treating meat to obtain the results disclosed herein involve placing meat in a closed heat source, e.g., an electric oven, maintained at a temperature of between about 900° and 1300° C. for a time sufficient to denature surface proteins up to a depth of not more than about 2 mm, i.e. typically between about 5 and 30 seconds. Preferably the oven will contain a ceramic grill which provides the surface of the meat with a grilled pattern further enhancing the appearance. This is particularly useful when treating meats which have previously been somewhat discolored. The oven is heated to the desired temperature with the grill in place and then the oven is opened and the meat placed on the grill for the desired length of time. Then, the meat is removed and preferably cooled at a refrigerated temperature and hermetically sealed.

EXAMPLE 1

Beef loin steaks about 1.9 cm thick and refrigerated at a temperature of 4.4° C. were exposed to UHT at varying times and temperatures as shown in Table 1. After exposure to UHT, the amount of shrinkage, final internal temperature, and depth of denaturation were measured and appearance was assessed visually, as summarized in Table 1.

TABLE 1

| Oven temp (°C.) | Time (sec) | Final internal temp (°C.) | Denaturation Depth (mm) | % Shrinkage | Appearance |
| --- | --- | --- | --- | --- | --- |
| 700 | 60 | 27 | 2–3 | 13 | slightly brown |
| 800 | 40 | 21 | 2–3 | 13 | slightly brown |
| 900 | 20 | 21 | 1–2 | 10 | slightly brown |
| 1000 | 10 | 15 | 0.5–1 | 6 | slightly brown |
| 1100 | 10 | 14 | 0.5–1 | 5 | evenly brown |
| 1200 | 5 | 13 | 0.5–1 | 5 | slightly burned |
| 1300 | 5 | 13 | 0.5–1 | 5 | burned |

These results show that treating meat with UHT at the lower end of the temperature range (700°–800° C.) gave higher final internal temperatures, denaturation to greater depth, and more shrinkage of the meat. Exposure times were selected based on depth of surface protein denaturation and attractive appearance of the treated steaks. Exposure times shorter than 5 seconds were not practical due to the amount of time needed to place and retrieve the steaks from the oven.

The acceptable temperature for UHT treatment was in a range from about 900° to 1200° C. with a range of from about 1000° to 1200° C. being preferred and about 1100° C. being most preferred. By use of the term "about" is meant that some variation is possible inasmuch as it is virtually impossible to maintain a constant temperature without any fluctuation. Therefore variations of from ±25° C. from that stated are considered acceptable. Exposure times of 5–20 seconds at these temperatures produced a steak with an acceptable grilled appearance with a denaturation depth of less than 1 mm. Shrinkage under these conditions was about 10% and the final internal temperature of the steaks was less than 21° C. Preferably, exposure times will be between about 5–15 seconds with about 10 seconds being optimal. Shrinkage of less than 10% and preferably not more than about 5% should be observed.

EXAMPLE 2

Steaks, having an average surface area of about 100 cm$^2$ and about 2 cm thick were exposed to UHF treatment at about 1100° C. for a period of about 10 seconds and were then cooled to about 4.4° C. and hermetically sealed under vacuum in a flexible polyethylene pouch which surrounds or envelopes the surface of the steaks.

Control steaks of the same size, but not treated with UHF, were also sealed in the same manner. Control and UHF treated steaks were both refrigerated at 4.4° C. and examined for the presence of both mesophilic and psychrotrophic bacteria after 24, 40 and 60 day periods. The control steaks were also examined at the time the storage period began for bacterial content.

Estimates of bacterial populations on the surfaces of raw vacuum-packaged or UHT-treated steaks were determined by removal of the packaging material and immersing the steaks in 99 ml of sterile 0.1% (w/v) peptone water diluent, shaking in a sterile bag, and plating on plate count agar. Compendium of Methods for the Microbiological Examination of Foods (APHA, 1984). Facultative and/or aerobic psychrophilic and mesophilic bacterial counts are shown in Table 2.

TABLE 2

| Storage (days) | Colony Forming Units/cm$^2$ | | | |
|---|---|---|---|---|
| | Raw | | UHT Treated | |
| | Mesophilic | Psychrophilic | Mesophilic | Psychrophilic |
| 0 | 620 | 810 | <10 | <10 |
| 20 | 780 | 1040 | 120 | 132 |
| 40 | 850 | 1260 | 130 | 160 |
| 60 | 1560 | 1810 | 110 | 170 |

These results show that bacterial counts on the surface of raw vacuum-packaged steaks increased upon storage at 4.4° C. for up to 60 days. Bacterial counts on UHT-treated steaks remained relatively low. Thus, facultative and/or aerobic psychrophilic and mesophilic vegetative bacteria which grow at refrigerated temperatures are effectively controlled by UHT treatment.

EXAMPLE 3

Raw meat is "aged" for a period sufficient to bring about a maturity or ripeness of flavor and improve tenderness of the fibers when cooked. The degree of tenderness is often determined by the shear value of a cooked core sample, i.e. the force required in Kg to shear a core of cooked tissue. The results below show that shear values of cooked cores of both raw vacuum-packaged and UHT-treated steaks decreased after storage at 4.4° C. The refrigerated vacuum packaged samples were cooked to an internal temperature of 74° C. in a microwave oven.

Shear values of UHT-treated and raw vacuum-packaged beef loin steaks were determined after storage at 4.4° C. As used herein, shear value is the force in kg required to shear a 1.3 cm diameter core of cooked tissue using a Warner-Bratzler shear. At various times after placing the steaks in storage, steaks were removed and cooked to 74° C. in a microwave oven. Then the shear values were determined.

TABLE 3

| Storage (days) | Shear Value | |
|---|---|---|
| | Raw | UHT |
| 0 | 10.25 | 9.75 |
| 10 | 7.5 | 3.9 |
| 20 | 6.4 | 4.1 |
| 40 | 4.3 | 5.2 |
| 60 | 4.5 | 4.3 |

As shown in Table 3, shear values of vacuum packed raw steaks decreased relatively rapidly within 10 days and continued to decrease slowly until a minimum was reached about 40 days after placing the steaks in storage. Shear values of the corresponding vacuum packed UHT-treated steaks also decreased rapidly within the first 10 days of storage, but did not decrease further upon additional refrigerated storage. The cooked samples of the UHT-treated steaks had lower shear values after 10 days of storage than did the cooked samples of the raw vacuum-packaged steaks at any time during the course of the experiment. These results suggest that UHT treatment of steaks does not interfere with the natural tenderization of meat during low temperature (4.4° C.) aging. It has long been known that aging at refrigerated temperatures (4.4° C.) improves tenderness. It is also clear that muscle tissue contains proteolytic enzymes that operate much more rapidly at 37° C. than at 4.4° C. J. Sharp, 14 J. Sci. Food Agric. 468 (1963).

Electron Beam Processing

The UHT treatment described above improves appearance, enhances aging and destroys vegetative pathogens and most spoilage organisms on the surface of the meat, thereby enabling extended storage at temperatures requiring refrigeration. It would also be desirable to provide means to destroy all vegetative pathogens, spores of pathogens, toxins and spoilage microorganisms which grow at ambient temperatures, i.e. temperatures of about 25°-35° C. and thereby improve storage of raw meat products over a wider or more elevated temperature range.

Electron beam processing is routinely used, as a source of radiation, for a variety of applications. Medical devices, such as catheters, syringes, needles, tubing, empty drug containers, and clean room clothing are sterilized with electron beam radiation (EBR) at doses between 15 and 30 kgray (1.5-3.0 Mrad). Polymers, such as thin-film polymers and composites, may be cross-linked by EBR at various doses. Hazardous wastes from hospitals and medical clinics are sterilized with EBR. Waste water and sewer sludge have been treated with EBR to kill pathogens therein. Further, in the food industry EBR is known to be used to pasteurize and sterilize food, prevent sprouting of vegetables such as potatoes, onions, and garlic, and kill certain insect pests in grains. In the United States, the use of radiation in the production, processing and handling of foods is governed generally under the provisions of 21 C.F.R. §§179 et seq. Table 4 summarizes some uses of EBR for treating foods.

TABLE 4

| Product | Purpose | Dose (kGy) |
|---|---|---|
| Wheat | Disinfest insects | 0.2-0.5 |
| White potatoes | Extend shelf life | 0.05-0.15 |
| Spices & seasonings | Disinfest insects | 30 |
| Dry enzyme preps. | Control insects & microorganisms | 10 |
| Pork carcasses or fresh non-cut processed cuts | Control Trichinella spiralis | 0.3-1.0 |
| Fresh fruits | Delay maturation | 1 |
| Dry enzyme preps. | Decontamination | 10 |
| Dry aromatic vegetable substances | Decontamination | 30 |
| Poultry | Control microorganisms | 3 |

The use of EBR as a method of sterilizing certain food products, such as listed above, has not extended to the treatment of a meat which has been preprocessed by another means, such as UHT followed by vacuum packaging. When compared with other forms of radiation, it is recognized that there are processing advantages attributed to EBR such as quick turn around time, short start-up time, simple operation, low power consumption, low temperature operation, accurate dosimetry control, less product degradation than with gamma irradiation, absence of constantly emitted radiation, large and small quantities of products may be treated, and all processing parameters may be continuously monitored.

Further, the high speed electrons generated by EBR results in more than just surface sterilization of the meat product and can be accomplished with the product in a packaged form following the UHT and packaging process. The degree of penetration is somewhat a function of the density of the material being treated. The treatment can be carried out at refrigerated temperatures, i.e. 4.4° C. or even at ambient temperatures if desired.

Vacuum packaged UHT-treated meats prepared according to Example 2 were exposed to EBR with a machine owned by Nutek Corp. (Salt Lake City, Utah). The machine specifications are as follows: Beam Power—1 kW; Energy—6 MeV; Demand Electrical Power—3.5 kW; Operating Range: Design—25-350 pulses per second (pps); Nominal—180-300 pps; Conveyor Speed—0.5-10 feet per minute; Typical Dose Rate—5 kgray (0.5 Mrad) per minute; Average Beam Current—120 microamps at 250 pps.

The machine was properly shielded and the vacuum packed UHF treated meat was subjected to radiation by passage on a conveyor past the beam window of the electron accelerator. The dose rate was adjusted by operational variables such as conveyor speed, beam power and energy, etc.

The method used for sterilizing meat with EBR involved, first, subjecting the meat to UHT treatment. Then, the UHT-treated meat was cooled and sealed in an air-tight container. Finally, the meat was irradiated with EBR. The UHT-treated meat is preferably cooled in the range of −20° to 10° C., and more preferably in the range of 2° to 4.4° C. before EBR treatment. The container may be sealed under vacuum or, alternatively, the air in the container may be replaced with an inert gas, such as $CO_2$, $N_2$, or a mixture of both. The container may be composed of any suitable material, preferably a laminated sealable plastic material that is impermeable to microorganisms, exchange of gases, and loss of moisture. Suitable materials include polyethylene, polypropylene, and the like.

EXAMPLE 4

Beef steaks were UHT treated by exposure to 1100° C. for 5-10 seconds. The UHT-treated meat was then cooled to <4.4° C. and packaged in a hermetically sealed polyethylene pouch under vacuum. Then the packaged meat was exposed to EBR at various dosages ranging from 0 to 20 kgray. Sterility, at ambient temperatures, was determined by incubating EBR irradiated meat samples at 30°-32° C. for 14 days in soybean casein digest medium, according to the United States Pharmacopeia (USP) sterility test. Results are given in Table 5.

TABLE 5

| Sterility of UHT-treated steaks treated with EBR | |
|---|---|
| Dose (kgray) | Sterile/Total Samples |
| 0 | 0/2 |
| 5 | 2/4 |
| 8 | 3/4 |
| 13 | 4/4 |

TABLE 5-continued

| Sterility of UHT-treated steaks treated with EBR | |
|---|---|
| Dose (kgray) | Sterile/Total Samples |
| 20 | 5/5 |

Sterility at 30°-32° C. appeared to be a function of dosage levels. While treatment at 5 and 8 kgray was somewhat effective, all UHT-treated meat samples that were exposed to at least 13 kgray of electron beam radiation were rendered completely sterile, as shown in Table 5. Suitable dosage ranges may vary from about 8 to 20 kgray with ranges of between about 10-15 kgray being preferred. Treatment at these dosages results in the destruction of all mesophilic vegetative pathogens, spores of pathogens, and spoilage microorganisms which would grow at room temperature.

Commercial sterilization also provides a method of aging meat at temperatures higher than with refrigeration (4.4° C.), without the growth of microorganisms that would spoil the meat or render it unsafe for consumption. Shear values of UHT- and EBR-treated steaks aged at either 4.4° C. or 43° C. indicate that the same degree of tenderness can be achieved in one day at 43° C. as in 14 days at 4.4° C.

TABLE 5

| Storage | Shear Value | |
|---|---|---|
| (days) | 4.4° C. | 43° C. |
| 0 | 10.5 | 10.5 |
| 1 | 10.0 | 4.1 |
| 10 | 7.1 | — |
| 14 | 4.6 | — |

Although the above examples and description demonstrate the us of UHT/EBR treatment in improving the shelf-life of raw meat, and beef steaks in particular, the same techniques can be utilized to treat other meat products. Therefore, the above examples are but illustrative of a complete and preferred embodiment which may be employed in operation of the present invention. The invention is directed to the discovery that the appearance, aging, and shelf life of raw meat products can be greatly improved by the combined treatment of UHT and EBR wherein the products are cooled and packaged following UHT treatment and then subjected to EBR to further destroy those pathogens which would be active at room temperatures. Therefore, within the guidelines presented herein, a certain amount of experimentation to obtain optimal operation parameters can be readily carried out by those skilled in the art. Therefore, the invention is limited in scope only by the following claims and functional equivalents thereof.

I claim:

1. A method of accelerating the aging process and producing pasteurized raw meat which can be stored for extended periods at refrigerated temperatures comprising the steps of:
    (a) treating said meat at ultra-high temperature of between about 900° and 1200° C. for a time sufficient to denature surface proteins, without burning, to a depth of not more than about 2 mm;
    (b) cooling said meat to a refrigerated temperature of between about 2° and 4.4° C.; and
    (c) hermetically sealing the cooled meat in an inert atmosphere.

2. The method according to claim 1 wherein said treatment time is between about 5 and 20 seconds.

3. The method according to claim 2 wherein said surface proteins are denatured to a depth of not more than about 1 mm.

4. The method according to claim 3 wherein said temperature is between about 1000° and 1200° C. and said treatment time is between about 5 and 15 seconds.

5. The method according to claim 4 wherein said meat is hermetically sealed in an inert gas.

6. The method according to claim 4 wherein said meat is hermetically sealed by vacuum packaging.

7. The method according to claim 4 wherein said meat is beef.

8. The method according to claim 7 wherein said beef is in the form of a steak.

9. The method according to claim 8 wherein said steak is treated in an electric oven containing a ceramic grill which contacts the surface of the steak providing it with a grilled pattern.

10. The method according to claim 9 wherein said steak is treated at a temperature of about 1100° C. for a time of about 10 seconds.

11. A method of accelerating the aging process and producing commercially sterile raw meat which can be stored for extended periods at either ambient or refrigerated temperatures comprising the steps of:
   (a) treating said meat at ultra-high temperature of between about 900° and 1200° C. for a time sufficient to denature surface proteins, without burning, to a depth of not more than about 2 mm;
   (b) cooling said meat to a refrigerated temperature of between about 2° and 4.4° C.;
   (c) hermetically sealing the cooled meat in an inert atmosphere, and
   (d) irradiating said hermetically sealed meat by electron beam radiation at a dosage sufficient to destroy all mesophilic vegetative pathogens, spores of pathogens, toxins, and spoilage microorganisms which grow at ambient temperatures.

12. The method according to claim 11 wherein said meat is irradiated at a dosage of between about 8 and 20 kgray.

13. The method according to claim 12 wherein said meat is irradiated at a dosage of between about 10 and 15 kgray.

14. The method according to claim 12 wherein said treatment time in step (a) is between about 5 and 20 seconds.

15. The method according to claim 14 wherein said surface proteins are denatured to a depth of not more than about 1 mm.

16. The method according to claim 15 wherein, in step (a), said temperature is between about 1000° and 1200° C. and said treatment time is between about 5 and 15 seconds.

17. The method according to claim 16 wherein said meat is hermetically sealed in an inert gas.

18. The method according to claim 16 wherein said meat is hermetically sealed by vacuum packaging.

19. The method according to claim 16 wherein said meat is beef.

20. The method according to claim 19 wherein said beef is in the form of a steak.

21. The method according to claim 19 wherein, in step (a), said steak is treated in an electric oven containing a ceramic grill which contacts the surface of the steak providing it with a grilled pattern.

22. The method according to claim 21 wherein said steak is treated at a temperature of about 1100° C. for a time of about 10 seconds.

* * * * *